United States Patent
Roberts et al.

(10) Patent No.: US 9,673,596 B2
(45) Date of Patent: Jun. 6, 2017

(54) BACK BOX WITH MOUNTING POSTS PROJECTING FROM RECESSED PORTIONS IN SIDEWALLS

(71) Applicant: Tyco Fire & Security GmbH, Neuhausen am Rheinfall (CH)

(72) Inventors: James T. Roberts, Amherst, NH (US); Alexander Andrews, Clinton, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 14/319,839

(22) Filed: Jun. 30, 2014

(65) Prior Publication Data
US 2015/0380913 A1    Dec. 31, 2015

(51) Int. Cl.
| | | |
|---|---|---|
| *H01J 5/00* | (2006.01) | |
| *H01J 15/00* | (2006.01) | |
| *H02G 3/08* | (2006.01) | |
| *H05K 5/00* | (2006.01) | |
| *F16M 13/02* | (2006.01) | |
| *H02G 3/18* | (2006.01) | |
| *H01H 9/02* | (2006.01) | |
| *H01H 13/04* | (2006.01) | |
| *H01H 19/04* | (2006.01) | |
| *H01H 21/04* | (2006.01) | |
| *H01H 23/04* | (2006.01) | |
| *H01R 13/46* | (2006.01) | |
| *H02G 3/14* | (2006.01) | |

(Continued)

(52) U.S. Cl.
CPC .......... *H02G 3/085* (2013.01); *F16M 13/02* (2013.01); *H02G 3/18* (2013.01); *H02G 3/08* (2013.01); *H02G 3/081* (2013.01); *H02G 3/086* (2013.01); *H02G 3/088* (2013.01); *H02G 3/10* (2013.01); *H02G 3/14* (2013.01)

(58) Field of Classification Search
CPC .......... B60R 11/02; B60R 2011/0005; Y10S 248/906; H02G 3/123; H02G 3/126; H02G 3/086; H02G 3/081; H02G 3/14; H02G 3/121; H02G 3/18; H02G 3/12; H02G 3/088; H02G 3/10; H02G 3/085; F21V 21/048; H05K 5/00; H05K 5/06; H05K 5/069
USPC .......... 248/27.1, 27.3, 205.1, 213.2, 231.9, 248/231.91, 906; 174/50, 50.5, 50.51, 53, 174/54, 58, 66, 67, 666; 220/3.2, 3.3, 220/3.8, 4.02; 361/600, 730, 752; 439/535, 538
See application file for complete search history.

(56) References Cited

U.S. PATENT DOCUMENTS 3,864,511 A * 2/1975 Morby et al. .......... 174/58
4,063,660 A * 12/1977 Ware .......... 220/3.6

(Continued)

*Primary Examiner* — Brian Mattei
*Assistant Examiner* — Taylor Morris
(74) *Attorney, Agent, or Firm* — HoustonHogle LLP (57) ABSTRACT

A weatherproof back box for receiving a fire alarm notification or other fire alarm device includes a back wall and sidewalls that project from the back wall and define a mouth. The sidewalls further include recessed portions that extend from the back wall toward the mouth, and end prior to the mouth. The back box further includes mounting posts, which are preferably less than 50% of the depth of the back box, that project from the recessed portions into the mouth. Additionally, these mounting posts receive fasteners for securing the fire alarm notification device in the mouth of the back box.

17 Claims, 6 Drawing Sheets

(51) Int. Cl.
*H05K 5/03* (2006.01)
*B65D 6/28* (2006.01)
*B65D 8/18* (2006.01)
*H02B 1/00* (2006.01)
*A47F 5/08* (2006.01)
*H02G 3/10* (2006.01)

(56) References Cited

U.S. PATENT DOCUMENTS

| | | | |
|---|---|---|---|
| 6,386,891 B1* | 5/2002 | Howard et al. | 439/76.1 |
| 6,642,447 B1* | 11/2003 | Mailloux | H02G 3/081 174/17 R |
| 6,743,981 B2* | 6/2004 | Miyakoshi | H02G 3/081 16/2.1 |
| 7,053,297 B2* | 5/2006 | Hull et al. | 174/50 |
| 7,304,236 B1* | 12/2007 | Gretz | H02G 3/18 174/50 |
| 7,353,961 B2* | 4/2008 | Hull | H02G 3/085 174/666 |
| 7,645,937 B2* | 1/2010 | Bhosale | 174/58 |
| 7,915,528 B2* | 3/2011 | Ni | H01R 13/5213 174/50 |
| 7,977,832 B2* | 7/2011 | Vadillo et al. | 310/62 |
| 8,158,884 B2* | 4/2012 | de la Borbolla | H02G 3/085 174/50 |
| 2011/0290625 A1* | 12/2011 | Castaldo | H02G 3/081 200/297 |
| 2013/0058044 A1* | 3/2013 | Watanabe | H05K 5/006 361/714 |

* cited by examiner

BACK BOX WITH MOUNTING POSTS PROJECTING FROM RECESSED PORTIONS IN SIDEWALLS

BACKGROUND OF THE INVENTION

Fire alarm notification devices (e.g., speakers, horns, bells, chimes, and flashing lights/strobes) are often mounted in weatherproof back boxes (back boxes). These back boxes provide protection from wet, humid, and/or outdoor environments. In general, a back box is an enclosure designed to receive a fire alarm notification device or other device of a fire alarm system such as a smoke or fire detector or a pull station, to list a few examples. The back boxes provide a volumetric region in which wires of the fire alarm devices are connected to interconnect wiring (e.g., power and/or communication) of the fire alarm system.

Figure 1:
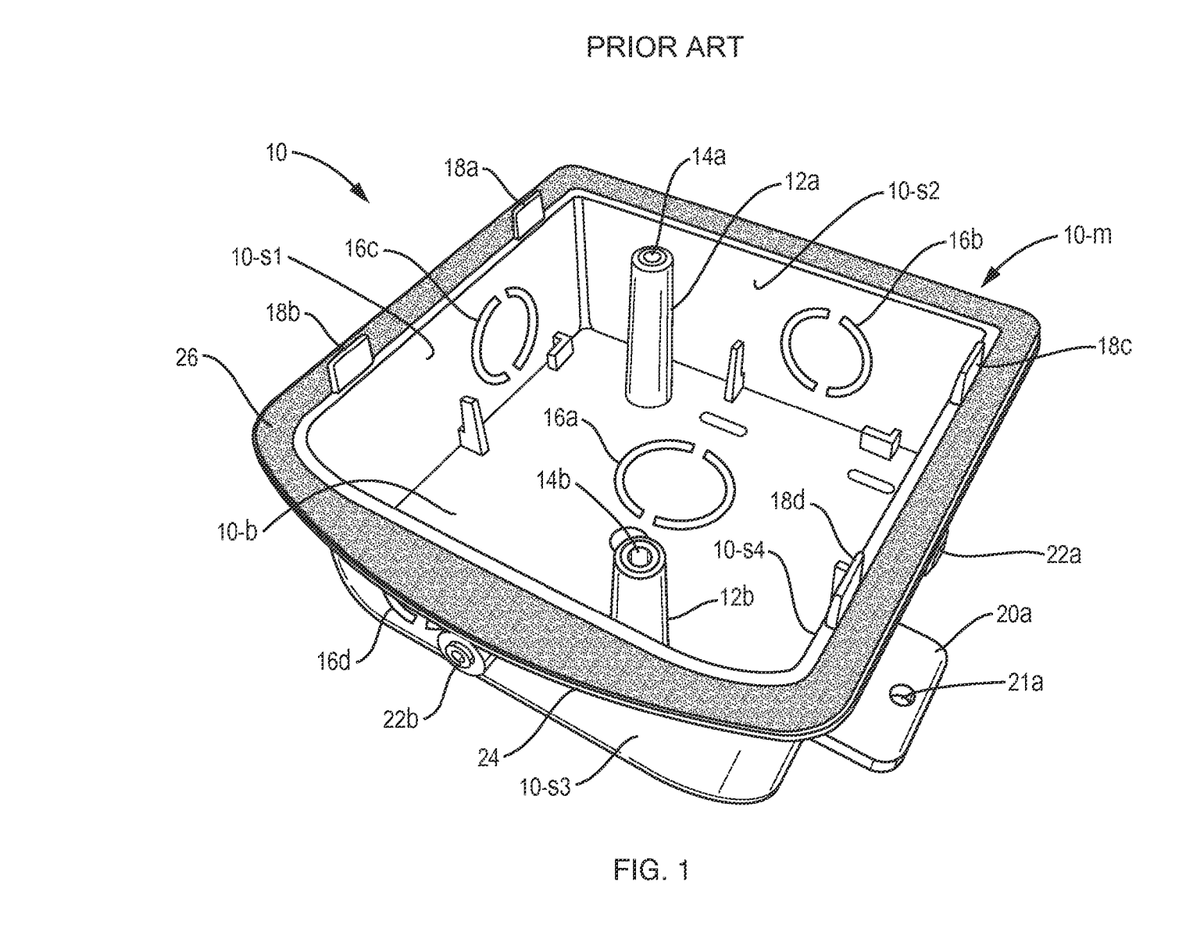
FIG. 1 is a perspective view illustrating an example of a conventional back box, which includes long mounting posts that project from the back wall to the mouth of the back box.

FIG. 1 illustrates an example of a back box 10, which was manufactured via injection molding. In the illustrated example, the back box 10 includes a back wall 10-*b* and sidewalls 10-*s*1, 10-*s*2, 10-*s*3, 10-*s*4, which project from the back wall 10-*b*. The sidewalls 10-*s*1 to 10-*s*4 define a mouth 10-*m*, which receives the fire alarm device. In the illustrated example, alignment tabs 18*a* to 18*d* are positioned on the sidewalls to align the fire alarm device in the mouth of the back box 10. The back box 10 further includes mounting posts (or bosses) 12*a* and 12*b*. These mounting posts 12*a*, 12*b* project from the back wall 10-*b* to the mouth 10-*m* of the back box 10. The mounting posts further include fastener receiving holes 14*a* and 14*b* for screws that secure the fire alarm device to the back box 10. The illustrated example further includes sidewall fastener receiving holes 22*a* and 22*b*, which receive additional fasteners for securing the fire alarm notification device to the back box 10.

Additionally, the back box 10 often includes other features. Installation tabs 20*a*, 20*b*, which include fastener receiving holes 21*a*, 21*b*, are used to attach the back box to a surface such as a vertical wall or ceiling. In the illustrated example, the back wall 10-*b* and sidewalls 10-*s*1 to 10-*s*4 include "punch outs" (or knock outs) 16*a* to 16*d* for connecting conduits to the back box 10. A gasket 26 sits on a gasket surface 24 to provide a seal between the fire alarm device and the back box 10.

SUMMARY OF THE INVENTION

There are, however, some problems when manufacturing conventional back boxes via injection molding. For example, the mounting posts 12*a*, 12*b*, which extend from the back wall 10-*b* to the mouth 10-*m* of the back box 10, are typically formed with long core pins that are part of the injection molding tool or mold. These pins are fragile and may break in the molding process. Additionally, the mounting posts 12*a*, 12*b* often necessitate longer cooling times due to associated plastic wall thicknesses and poor cooling along the length of the posts and mounting posts may occasionally warp or develop irregular surface conditions which can impair the ejection of the back box from the tool or mold.

The present invention is directed to a back box, which includes one or more recessed portions in sidewalls of the back box. One or more mounting posts project from the recessed portions into a mouth of the back box. Typically, the mounting posts each have a length that is less than 50% of the depth of the back box. By reducing the length of the mounting posts, the injection molding no longer requires long and thus fragile core pins. As a result, the mold or tool is more mechanically robust and thus less susceptible to breakage. Also, the shorter mounting posts can be cooled more quickly, which improves mold cycle times.

In general, according to one aspect, the invention features a back box for a fire alarm device, such as a fire alarm notification device. The back box includes a back wall and one or more sidewalls projecting from the back wall and defining a mouth for receiving the fire alarm device. The one or more sidewalls further include one or more recessed portions. Additionally, the back box also comprises one or more mounting posts projecting from the recessed portions into the mouth. These one or more mounting posts receive fasteners for securing the fire alarm device in the mouth.

Preferably, the mounting posts project from surfaces of the recessed portions. Additionally, the one or more recessed portions extend from the back wall toward the mouth, and end prior to the mouth.

In a preferred embodiment, the one or more mounting posts each have a length that is less than 50% of the depth of the back box.

Typically, the one or more mounting posts maintain uniform wall thicknesses throughout the length of the one or more mounting posts.

In embodiments, the back box includes device alignment tabs projecting from the one or more sidewalls of the back box to align the fire alarm device within the mouth of the back box.

In a typical implementation, the back box includes one or more installation tabs, which include fastener receiving holes for mounting the back box to surfaces.

In general, according to yet another aspect, the invention features a back box for a fire alarm device. The back box comprises a back wall and one or more sidewalls projecting from the back wall and defining a mouth for receiving the fire alarm device. The back box further includes one or more mounting posts projecting from the sidewalls into the mouth. Additionally, the one or more mounting posts receives fasteners for securing the fire alarm notification device in the mouth.

In general, according to yet another aspect, the invention features a back box for a fire alarm notification device that includes a back wall and one or more sidewalls projecting from the back wall and defining a mouth for receiving the fire alarm notification device. The back box further including one or more mounting posts projecting into the mouth. Additionally, the one or more mounting posts each have a length that is less than 50% of the depth of the back box.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features and/or components, but do not preclude the presence or addition of one or more other features, components, and/or groups thereof. Further, it will be understood that when an element, including component, is referred to and/or shown as being connected or coupled to another element, it can be directly connected or coupled to the other element or intervening elements may be present.

Figure 2:
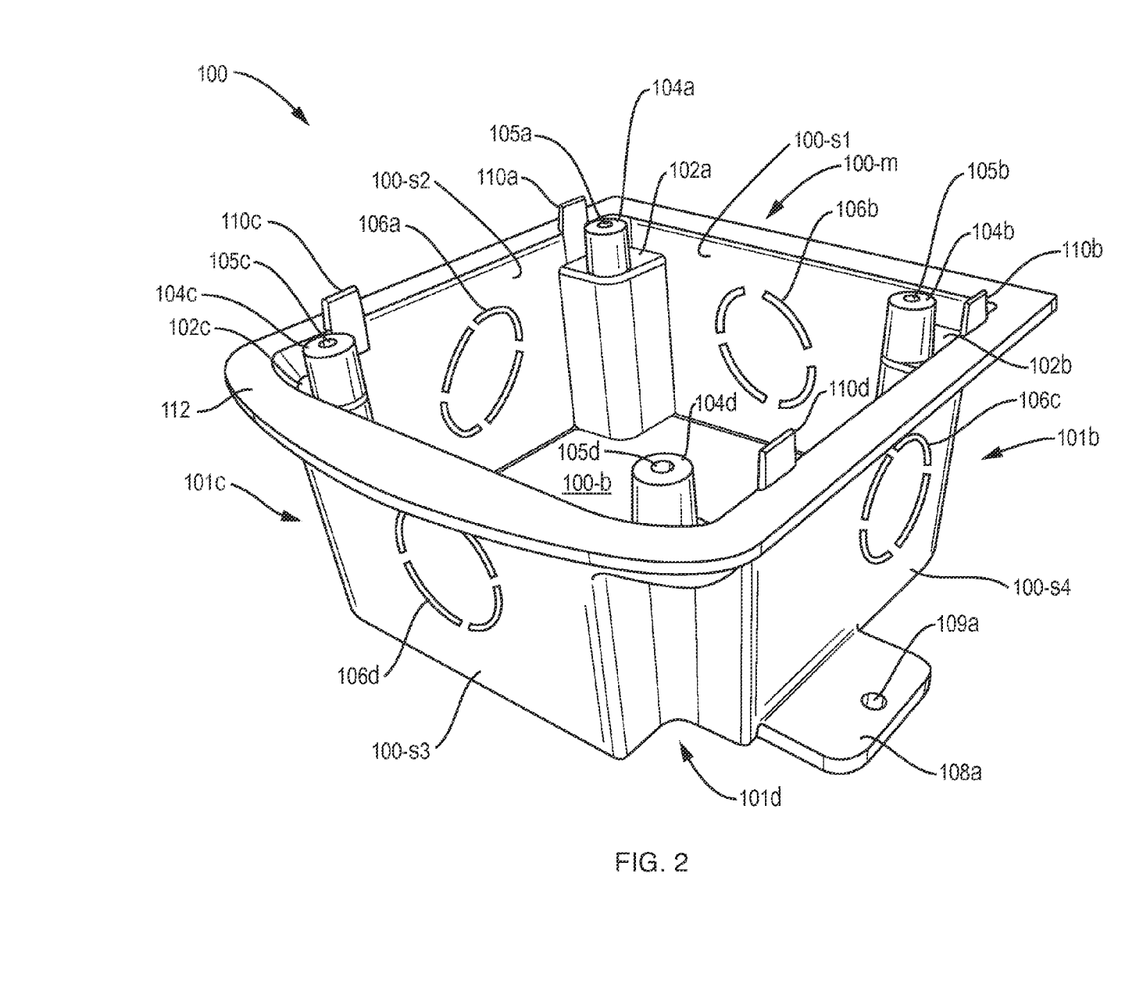
FIG. 2 is a perspective view illustrating the mouth, sidewalls, and recessed portions of the inventive back box.
Figure 3:
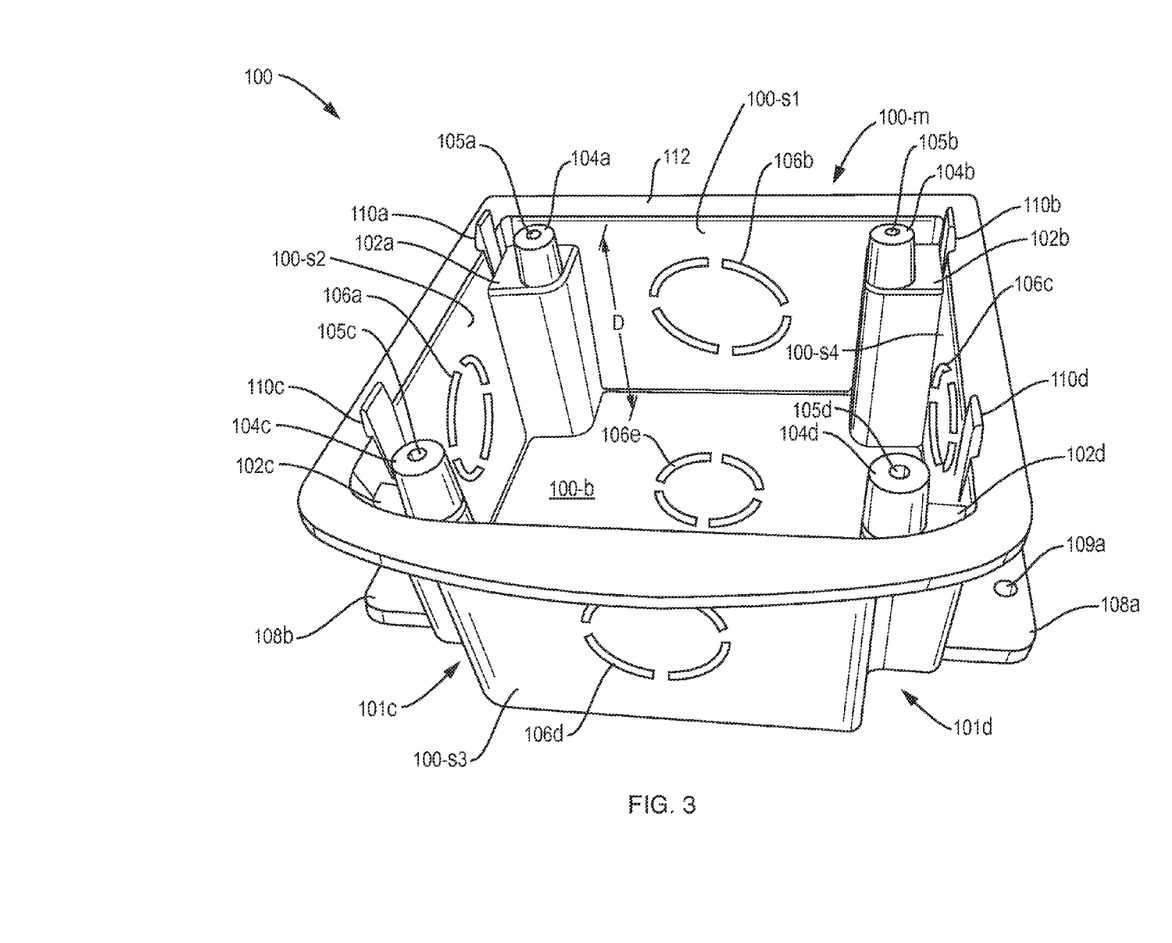
FIG. 3 is a perspective view further illustrating the mouth, sidewalls, and recessed portions of the inventive back box.

FIGS. 2 and 3 are perspective views that illustrate a back box 100, which has been constructed according to the principles of the present invention.

In the illustrated example, the back box 100 include a back wall 100-*b* and four sidewalls 100-*s*1 to 100-*s*4, which project from the back wall 100-*b* to form a generally rectilinear open box. These sidewalls define a mouth 100-*m* of the back box 100 that receives a fire alarm notification device, or more generally a fire alarm device. Some examples of fire alarm notification devices include speakers, horns, bells, chimes, and flashing lights/strobes. Fire alarm device is a broader class that includes fire alarm notification devices and further includes fire detection devices (e.g., smoke detectors) and other devices such as pull stations.

The back wall and sidewalls define a volumetric region in which wires of the fire alarm notification devices are able to be connected to wiring (e.g., power and/or communication) of an interconnect of a fire alarm system.

While the illustrated example is directed to a back box with four sidewalls for a fire alarm notification device, it will be understood by those skilled in the art that back boxes could be manufactured in different sizes, shapes, and with different numbers of sidewalls to accommodate different fire alarm notification devices and fire detection devices (e.g., smoke detectors and temperature sensors).

In a preferred embodiment, the sidewalls 100-*s*1 to 100-*s*4 include recessed portions 101*a* to 101*d*, which extend from the back wall 100-*b* toward the mouth 100-*m* and end prior to the mouth 100-*m*. These recessed portions can help reduce the amount of material (e.g., plastic) required to make the back box 100. Additionally, surfaces 102*a* to 102*d* are formed.

Mounting posts 104*a* to 104*d* project from the surfaces 102*a* to 102*d* into the mouth 100-*m* of the back box 100. The mounting posts 104*a* to 104*d* include fastener receiving holes 105*a* to 105*d* that receive fasteners for securing the fire alarm notification device in the mouth 100-*m*. Preferably, the mounting posts 104-*a* to 104-*d* each have a length that is less than 50% of the depth 'D' of the back box 100, and the length is preferably less than 20% of the depth 'D' of the back box. In one current embodiment, the mounting posts 104*a*-*d* are approximately ⅜ inches (or about 1 centimeter) in length. However, in a typical implementation, the size and shape of the mounting posts are based on the size and shape of the back box and the size of the fasteners required to install a fire alarm notification device in the back box. In any event, the shorten posts result in less fragile mold pins used in their manufacture.

Generally, the mounting posts 104*a* to 104*d* maintain uniform wall thicknesses throughout the length of the mounting posts 104*a* to 104*d*. This provides more even cooling of the back box immediately after injection molding, less chance of warping, and water lines can be run into all required areas of the back box 100 to further facilitate cooling.

In alternative embodiments, the recessed portions 101*a* to 101*d* and mounting posts 104*a* to 104*d* may be located along the sidewalls 100-*s*1 to 100-*s*4, rather than at the corners, to provide compatibility with fire alarm notification devices fire detection devices that require mounting posts in different locations of the back box.

Typically, the back box 100 includes installation tabs 108*a*, 108*b* for installing the back box to surfaces (e.g., walls or ceilings). These tabs 108*a*, 108*b* generally have fastener receiving holes 109*a*, 109*b* that are designed to accept fasteners such as screws for affixing the back box 100 to the surfaces.

In the illustrated example, the sidewalls 100-*s*1 to 100-*s*4 and the back wall 100-*b* include "punch outs" (or knock outs) 106*a* to 106*e*. These punch outs 106*a* to 106*e* provide access to the volumetric region of the back box for conduits, which carry alarm system interconnect wiring (e.g., power and/or communication wires). Typically, the conduit is sealed against the back box to prevent moisture, dirt, and/or other contaminants from entering the back box.

In a current implementation, the back box 100 is fabricated from plastic via an injection molding. Alternatively, other manufacturing techniques (e.g., casting, or stamping) could be used to fabricate the back boxes. Likewise, other materials such as aluminum, stainless steel, or alloys may be used in the manufacture of the back boxes.

Figure 4:
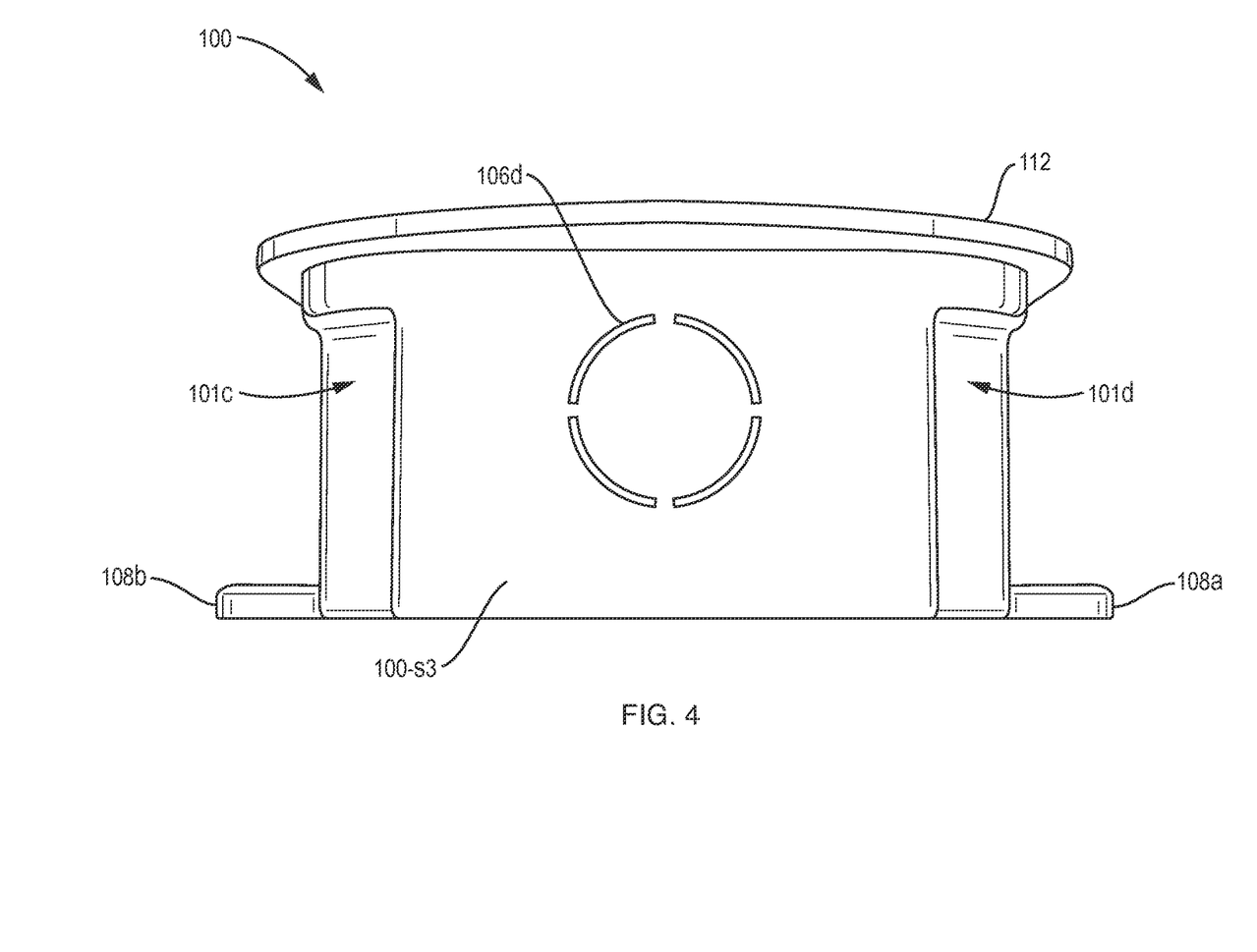
FIG. 4 is a perspective view further illustrating recessed portions of the inventive back box.

FIG. 4 further illustrates the recessed portions 101*c*, 101*d* in sidewall 100-*s*3 of the back box 100. Moreover, this figure illustrates how the recessed portions 101*c*, 101*d* extend from the back wall toward the mouth and end prior to the mouth of the back box 100. Additionally, punch out 106*d* and installation tabs 108*a*, 108*b* of the back box 100 are also further illustrated.

Figure 5:
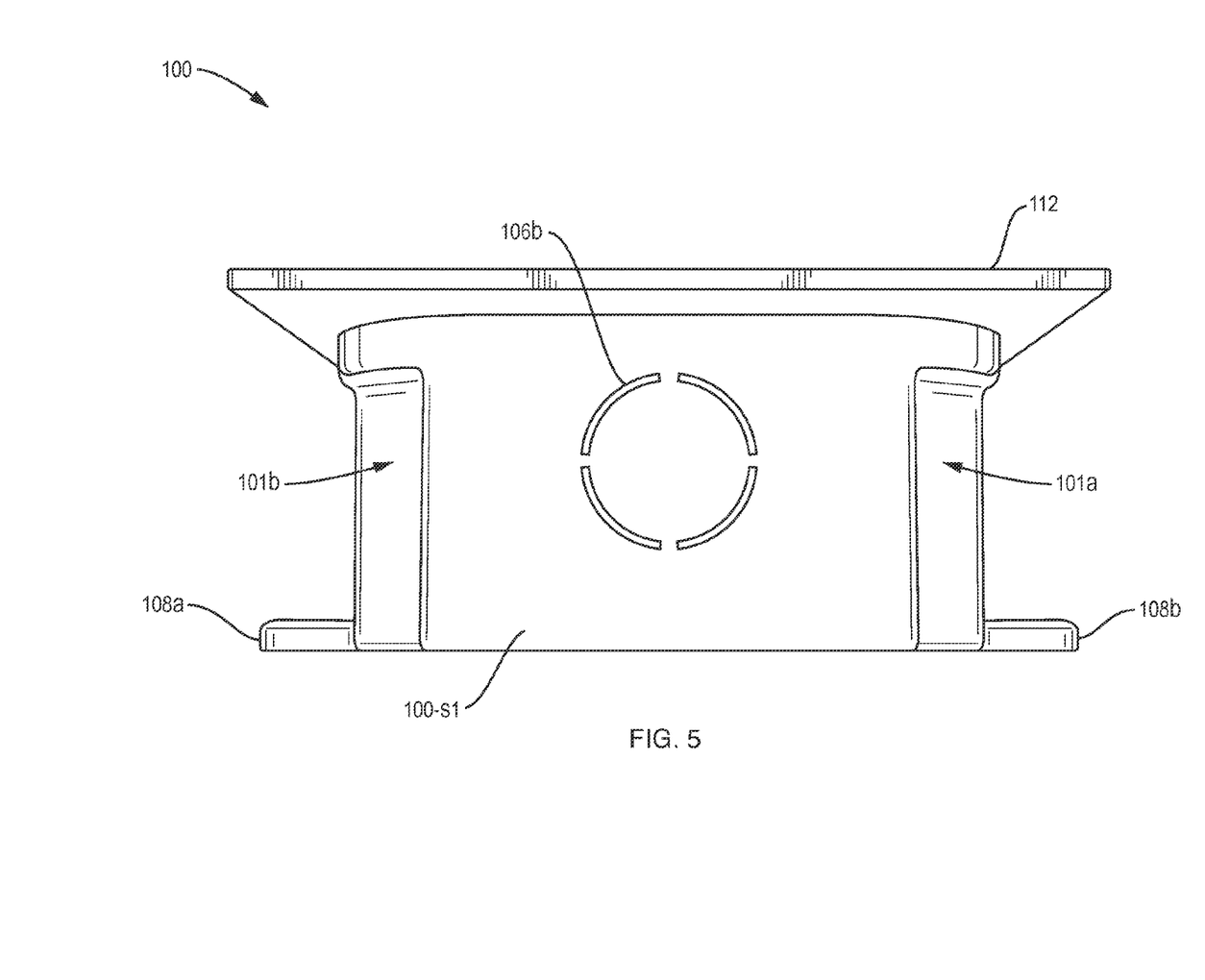
FIG. 5 is a perspective view further illustrating recessed portions of the inventive back box.

FIG. 5 is another view that illustrates the recessed portions 101*a*, 101*b* in sidewall 100-*s*1 of the back box 100 and how the recessed portions 101*a*, 101*b* extend from the back wall toward the mouth and end prior to the mouth.

Figure 6:
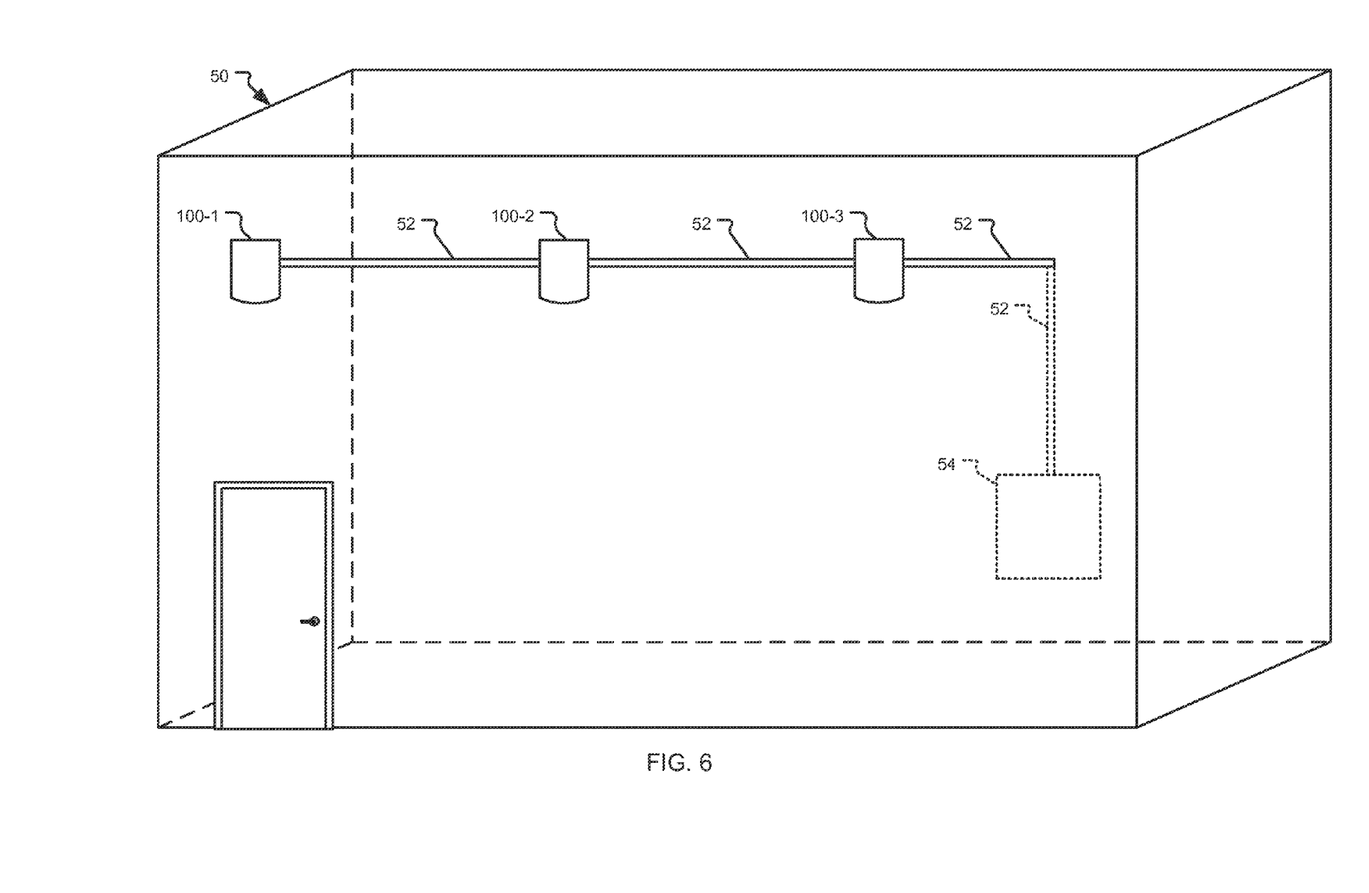
FIG. 6 is a schematic view that illustrates an example of a fire alarm system that uses back boxes mounted to a building.

FIG. 6 is a schematic view that illustrates an example of a fire alarm system that includes back boxes 100-1 to 100-3 installed on an exterior of a building 50.

In general, a fire alarm system includes fire detection devices, fire alarm notification devices, and a control panel. The fire detection devices (not shown) such as smoke detectors or temperature sensors are located throughout a building to detect indicators of fire. In response to indicators of fire being detected by the fire detection devices, the control panel receives a signal that one or more fire detection devices have been triggered and activates audio and/or visible alarms of the fire alarm notification devices.

In the illustrated example, the back boxes 100-1 to 100-3 are installed on an exterior (or unfinished) wall of a building 50. Some examples of buildings include hospitals, warehouses, retail establishments, malls, schools, or casinos, and/or gymnasiums to list a few examples. Conduit 52, which carries alarm system interconnect wiring, connects the back boxes 100-1 to 100-3 to each other and to a control panel 54. Typically, the control panel 54 is located within the interior building 50.

While this invention has been particularly shown and described with references to preferred embodiments thereof, it will be understood by those skilled in the art that various changes in form and details may be made therein without departing from the scope of the invention encompassed by the appended claims.

What is claimed is:

1. A back box for a fire alarm device, comprising:
   a back wall and one or more sidewalls projecting from the back wall and defining a mouth for receiving the fire alarm device, wherein the one or more sidewalls comprise one or more recessed portions, the sidewalls including punch outs that are sized to receive conduits;
   one or more mounting posts projecting from the recessed portions into the mouth, wherein the one or more mounting posts receive fasteners for securing the fire alarm device in the mouth;
   device alignment tabs projecting from inner sides of the one or more sidewalls and projecting into the mouth of the back box to align the fire alarm device within the mouth of the back box, the device alignment tabs projecting beyond a top surface (112) of the sidewalls; and
   one or more installation tabs, which are mounted to the one or more sidewalls and include fastener receiving holes for mounting the back box to surfaces,
   wherein the one or more mounting posts each have a length that is less than 50% of the depth of the back box.

2. The back box according to claim 1, wherein the mounting posts project from surfaces of the recessed portions.

3. The back box according to claim 2, wherein the one or more recessed portions extend from the back wall toward the mouth, and end prior to the mouth.

4. The back box according to claim 1, wherein the one or more mounting posts maintain uniform wall thicknesses throughout the length of the one or more mounting posts.

5. The back box according to claim 1, wherein the one or more installation tabs are mounted to the one or more sidewalls where the sidewalls project from the back wall, and wherein the one or more installation tabs are mounted adjacent to one or more corners of the sidewalls.

6. The back box according to claim 5, wherein the one or more recessed portions are located along the one or more corners of the sidewalls.

7. The back box according to claim 1, wherein the one or more installation tabs have a rounded rectangular shape.

8. The back box according to claim 1, wherein the length of the one or more mounting posts is less than 20% of the depth of the back box.

9. The back box according to claim 1, wherein the recessed portions extend from the back wall along one or more corners of the sidewalls such that the one or more mounting posts project into the mouth of the back box.

10. The back box according to claim 1, further comprising four of the recessed portions located at each of four intersections of four of the sidewalls and four of the mounting posts projecting from each of the recessed portions.

11. A back box for a fire alarm device, comprising:
    a back wall and one or more sidewalls projecting from the back wall and defining a mouth for receiving the fire alarm device, the sidewalls including punch outs that are sized to receive conduits;
    one or more mounting posts projecting from the sidewalls into the mouth, wherein the one or more mounting posts receive fasteners for securing the fire alarm device in the mouth;
    device alignment tabs projecting from inner side of the one or more sidewalls and projecting within the mouth of the back box to align the fire alarm device within the mouth of the back box, the device alignment tabs projecting beyond a top surface (112) of the sidewalls; and
    one or more installation tabs, which are mounted to the one or more sidewalls and include fastener receiving holes for mounting the back box to surfaces,
    wherein the one or more mounting posts each have a length that is less than 50% of the depth of the back box.

12. The back box according to claim 11, wherein the one or more sidewalls comprise one or more recessed portions.

13. The back box according to claim 12, wherein the recessed portions extend from the back wall toward the mouth, and end prior to the mouth.

14. The back box according to claim 12, wherein the one or more mounting posts maintain uniform wall thicknesses throughout the length of the one or more mounting posts.

15. A back box for a fire alarm device, comprising:
    a back wall and one or more sidewalls projecting from the back wall and defining a mouth for receiving the fire alarm device, the sidewalls including punch outs that are sized to receive conduits;
    one or more mounting posts projecting into the mouth, wherein the one or more mounting posts each have a length that is less than 50% of the depth of the back box;
    device alignment tabs projecting from inner sides of the one or more sidewalls and projecting into the mouth of the back box to align the fire alarm device within the mouth of the back box, the device alignment tabs projecting beyond a top surface (112) of the sidewalls; and
    one or more installation tabs, which are mounted to the one or more sidewalls and include fastener receiving holes for mounting the back box to surfaces.

16. The back box according to claim 15, wherein the one or more sidewalls comprise one or more recessed portions.

17. The back box according to claim 15, wherein the one or more mounting posts maintain uniform wall thicknesses throughout the length of the one or more mounting posts.

\* \* \* \* \*